United States Patent
Thomsen et al.

(10) Patent No.: US 9,147,397 B2
(45) Date of Patent: Sep. 29, 2015

(54) VAD DETECTION APPARATUS AND METHOD OF OPERATING THE SAME

(71) Applicant: Knowles Electronics, LLC, Itasca, IL (US)

(72) Inventors: Henrik Thomsen, Holte (DK); Dibyendu Nandy, Naperville, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 14/525,413

(22) Filed: Oct. 28, 2014

(65) Prior Publication Data

US 2015/0120299 A1    Apr. 30, 2015

Related U.S. Application Data

(60) Provisional application No. 61/896,723, filed on Oct. 29, 2013.

(51) Int. Cl.
 *G10L 15/00* (2013.01)
 *G10L 15/22* (2006.01)
 *H04W 4/16* (2009.01)
 *G10L 25/78* (2013.01)

(52) U.S. Cl.
 CPC .............. *G10L 15/22* (2013.01); *H04W 4/16* (2013.01); *G10L 25/78* (2013.01)

(58) Field of Classification Search
 None
 See application file for complete search history.

(56) References Cited

U.S. PATENT DOCUMENTS

| | | | | |
|---|---|---|---|---|
| 4,052,568 A | * | 10/1977 | Jankowski | 704/233 |
| 5,577,164 A | * | 11/1996 | Kaneko et al. | 704/275 |
| 5,983,186 A | * | 11/1999 | Miyazawa et al. | 704/275 |
| 6,070,140 A | * | 5/2000 | Tran | 704/275 |
| 6,324,514 B2 | * | 11/2001 | Matulich et al. | 704/275 |
| 6,591,234 B1 | * | 7/2003 | Chandran et al. | 704/225 |
| 7,774,202 B2 | * | 8/2010 | Spengler et al. | 704/236 |
| 2006/0247923 A1 | * | 11/2006 | Chandran et al. | 704/211 |
| 2010/0292987 A1 | | 11/2010 | Kawaguchi et al. | |
| 2011/0106533 A1 | | 5/2011 | Yu | |
| 2012/0232896 A1 | * | 9/2012 | Taleb et al. | 704/233 |
| 2012/0310641 A1 | * | 12/2012 | Niemist et al. | 704/233 |
| 2013/0246071 A1 | * | 9/2013 | Lee et al. | 704/275 |
| 2014/0188467 A1 | * | 7/2014 | Jing et al. | 704/233 |
| 2015/0049884 A1 | | 2/2015 | Ye | |

FOREIGN PATENT DOCUMENTS

| | | |
|---|---|---|
| WO | 2009130591 A1 | 10/2009 |
| WO | 2011140096 A1 | 11/2011 |
| WO | 2013049358 A1 | 4/2013 |

OTHER PUBLICATIONS

International Search Report and Written Opinion for PCT/US2014/062861 dated Jan. 23, 2015 (12 pages).

* cited by examiner

*Primary Examiner* — Daniel Abebe
(74) *Attorney, Agent, or Firm* — Fitch, Even, Tabin & Flannery LLP (57) ABSTRACT

At a processing device, a first signal from a first microphone and a second signal from a second microphone are received. The first signal indicates whether a voice signal has been determined at the first microphone, and the second signal indicates whether a voice signal has been determined at the second microphone. When the first signal indicates potential voice activity or the second signal indicates potential voice activity, the processing device is activated to receive data and the data is examined for a trigger word. When the trigger word is found, a signal is sent to an application processor to further process information from one or more of the first microphone and the second microphone. When no trigger word is found, the processing device is reset to deactivate data input and allowing the first microphone and the second microphone to enter or maintain an event detection mode of operation.

14 Claims, 8 Drawing Sheets

- Channel 5: passband between 4000 to 8000 Hz
- Channel 4: passband between 2000 to 4000 Hz
- Channel 3: passband between 1000 to 2000 Hz
- Channel 2: passband between 500 to 1000 Hz
- Channel 1: passband between 0 to 500 Hz

VAD DETECTION APPARATUS AND METHOD OF OPERATING THE SAME

CROSS REFERENCE TO RELATED APPLICATION

This patent claims benefit under 35 U.S.C. §119 (e) to U.S. Provisional Application No. 61/896,723 entitled "VAD Detection Apparatus and method of operating the same" filed Oct. 29, 2013, the content of which is incorporated herein by reference in its entirety.

TECHNICAL FIELD

This application relates to microphones and, more specifically, to voice activity detection (VAD) approaches used with these microphones.

BACKGROUND OF THE INVENTION

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a digital signal process (DSP) may first detect if there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phones and personal computers.

In the use of these approaches, false detections, trigger word detections, part counts and silicon area and current consumption have become concerns, especially since these approaches are deployed in electronic devices such as cellular phones. Previous approaches have proven inadequate to address these concerns. Consequently, some user dissatisfaction has developed with respect to these previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide voice activity detection (VAD) methods and devices that determine whether an event or human voice is present. The approaches described herein are efficient, easy to implement, lower part counts, are able to detect voice with very low latency, and reduce false detections.

It will appreciated that the approaches described herein can be implemented using any combination of hardware or software elements. For example, an application specific integrated circuit (ASIC) or microprocessor can be used to implement the approaches described herein using programmed computer instructions. Additionally, while the VAD approaches may be disposed in the microphone (as described herein), these functionalities may also be disposed in other system elements.

In many of these embodiments and at a processing device, a first signal from a first microphone and a second signal from a second microphone are received. The first signal indicates whether a voice signal has been determined at the first microphone, and the second signal indicates whether a voice signal has been determined at the second microphone. When the first signal indicates potential voice activity or the second signal indicates potential voice activity, the processing device is activated to receive data and the data is examined for a trigger word. When the trigger word is found, a signal is sent to an application processor to further process information from one or more of the first microphone and the second microphone. When no trigger word is found, the processing device is reset to deactivate data input and allowing the first microphone and the second microphone to enter or maintain an event detection mode of operation.

In other aspects, the application processor utilizes a voice recognition (VR) module to determine whether other or further commands can be recognized in the information. In other examples, the first microphone and the second microphone transmit pulse density modulation (PDM) data.

In some other aspects, the first microphone includes a first voice activity detection (VAD) module that determines whether voice activity has been detected, and the second microphone includes a second voice activity detection (VAD) module that determines whether voice activity has been detected. In some examples, the first VAD and the second VAD module perform the steps of: receiving a sound energy from a source; filtering the sound energy into a plurality of filter bands; obtaining a power estimate for each of the plurality of filter bands; and based upon each power estimate, determining whether voice activity is detected.

In some examples, the filtering utilizes one or more low pass filters, high pass filters, and frequency dividers. In other examples, the power estimate comprises an upper power estimate and a lower power estimate.

In some aspects, either the first VAD module or the second VAD module performs Trigger Phrase recognition. In other aspects, either the first VAD module or the second VAD module performs Command Recognition.

In some examples, the processing device controls the first microphone and the second microphone by varying a clock frequency of a clock supplied to the first microphone and the second microphone.

In many of these embodiments, a system, the system includes a first microphone with a first voice activity detection (VAD) module and a second microphone with a second voice activity detection (VAD) module, and a processing device. The processing device is communicatively coupled to the first microphone and the second microphone, and configured to receive a first signal from the first microphone and a second signal from the second microphone. The first signal indicates whether a voice signal has been determined at the first microphone by the first VAD module, and the second signal indicates whether a voice signal has been determined at the second microphone by the second VAD module. The processing device is further configured to when the first signal indicates potential voice activity or the second signal indicates potential voice activity, activate and receive data from the first microphone or the second microphone, and subsequently examine the data for a trigger word. When the trigger word is found, a signal is sent to an application processor to further process information from one or more of the first microphone and the second microphone. The processing device is further configured to when no trigger word is found, transmit a third signal to the first microphone and the second microphone. The third signal causes the first microphone and second microphone to enter or maintain an event detection mode of operation.

In one aspect, either the first VAD module or the second VAD module performs Trigger Phrase recognition. In another aspect, either the first VAD module or the second VAD module performs Command Recognition. In other examples, the processing device controls the first microphone and the second microphone by varying a clock frequency of a clock supplied to the first microphone and the second microphone.

In many of these embodiments, voice activity is detected in a micro-electro-mechanical system (MEMS) microphone. Sound energy is received from a source and the sound energy is filtered into a plurality of filter bands. A power estimate is obtained for each of the plurality of filter bands. Based upon each power estimate, a determination is made as to whether voice activity is detected.

In some aspects, the filtering utilizes one or more low pass filters, high pass filters and frequency dividers. In other examples, the power estimate comprises an upper power estimate and a lower power estimate. In some examples, ratios between the upper power estimate and the lower power estimate within the plurality of filter bands are determined, and selected ones of the ratios are compared to a predetermined threshold. In other examples, ratios between the upper power estimate and the lower power estimate between the plurality of filter bands are determined, and selected ones of the ratios are compared to a predetermined threshold.

Figure 1:
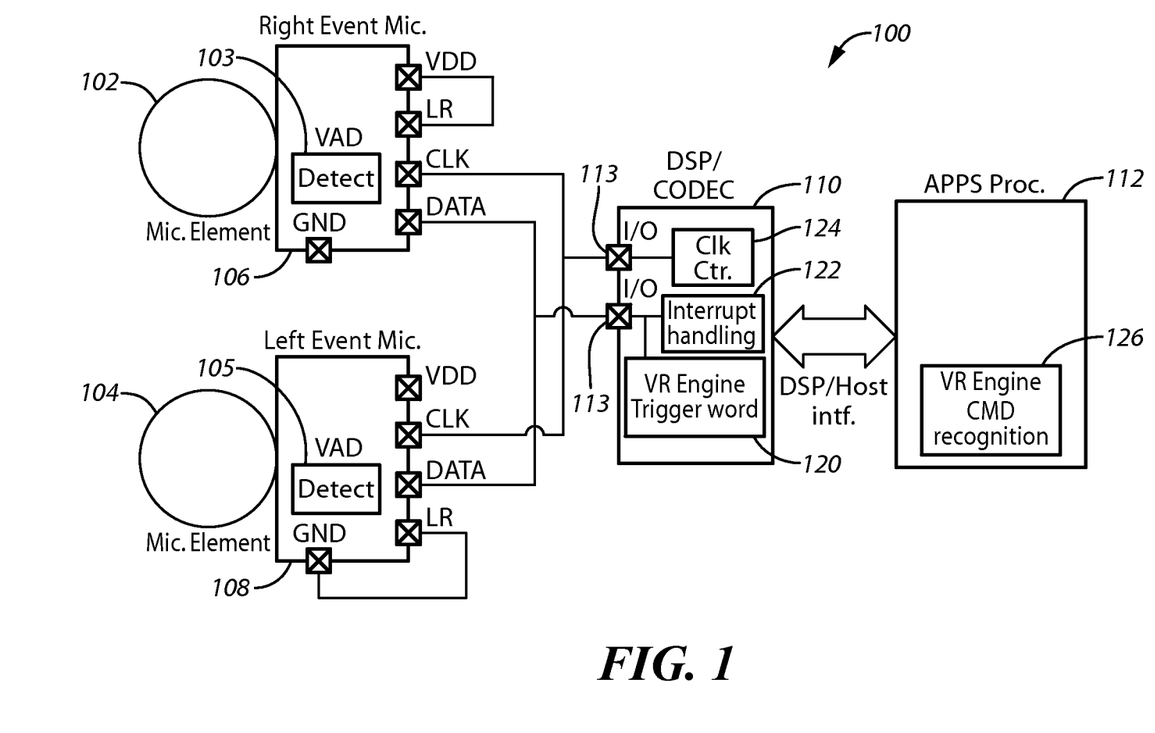
FIG. 1 comprises a block diagram of a system with microphones that uses VAD approaches according to various embodiments of the present invention.

Referring now to FIG. 1, a system 100 that utilizes a Voice Activity Detection (VAD) approaches is described. The system 100 includes a first microphone element 102, a second microphone element 104, a right event microphone 106, a left event microphone 108, a digital signal processor (DSP)/codec 110, and an application processor 112. Although two microphones are shown in the system 100, it will be understood that any number of microphones may be used and not all of needs to have a VAD, but at least one.

The first microphone element 102 and the second microphone element 104 are microelectromechanical system (MEMS) elements that receive sound energy and convert the sound energy into electrical signals that represent the sound energy. In one example, the elements 102 and 104 include a MEMS die, a diaphragm, and a back plate. Other components may also be used.

The right event microphone 106 and the left event microphone 108 receive signals from the microphone elements 102 and 104, and process these signals. For example, the elements 106 and 108 may include buffers, preamplifiers, analog-to-digital (A-to-D) converters, and other processing elements that convert the analog signal received from elements 102 and 104 into digital signals and perform other processing functions. These elements may, for example, include an ASIC that implements these functions. The right event microphone 106 and the left event microphone 108 also include voice activity detection (VAD) modules 103 and 105 respectively and these may be implemented by an ASIC that executes programmed computer instructions. The VAD modules 103 and 105 utilize the approaches described herein to determine whether voice (or some other event) has been detected. This information is transmitted to the digital signal processor (DSP)/codec 110 and the application processor 112 for further processing. Also, the signals (potentially voice information) now in the form of digital information are sent to the digital signal processor (DSP)/codec 110 and the application processor 112.

The digital signal processor (DSP)/codec 110 receives signals from the elements 106 and 108 (including whether the VAD modules have detected voice) and looks for trigger words (e.g., "Hello, My Mobile") using a voice recognition (VR) trigger engine 120. The codec 110 also performs interrupt processing (see FIG. 2) using interrupt handling module 122. If the trigger word is found, a signal is sent to the application processor 112 to further process received information. For instance, the application processor 112 may utilize a VR recognition module 126 (e.g., implemented as hardware and/or software) to determine whether other or further commands can be recognized in the information.

In one example of the operation of the system of FIG. 1, the right event microphone 106 and/or the left event microphone 108 will wake up the digital signal processor (DSP)/codec 110 and the application processor 112 by starting to transmit pulse density modulation (PDM) data. General input/output (I/O) pins 113 of the digital signal processor (DSP)/codec 110 and the application processor 112 are assumed to be configurable for interrupts (or simply polling) as described below with respect to FIG. 2. The modules 103 and 105 may perform different recognition functions; one VAD module may perform Trigger Keyword recognition and a second VAD module may perform Command Recognition. In one aspect, the digital signal processor (DSP)/codec 110 and the application processor 112 control the right event microphone 106 and the left event microphone 108 by varying the clock frequency of the clock 124.

Figure 2:
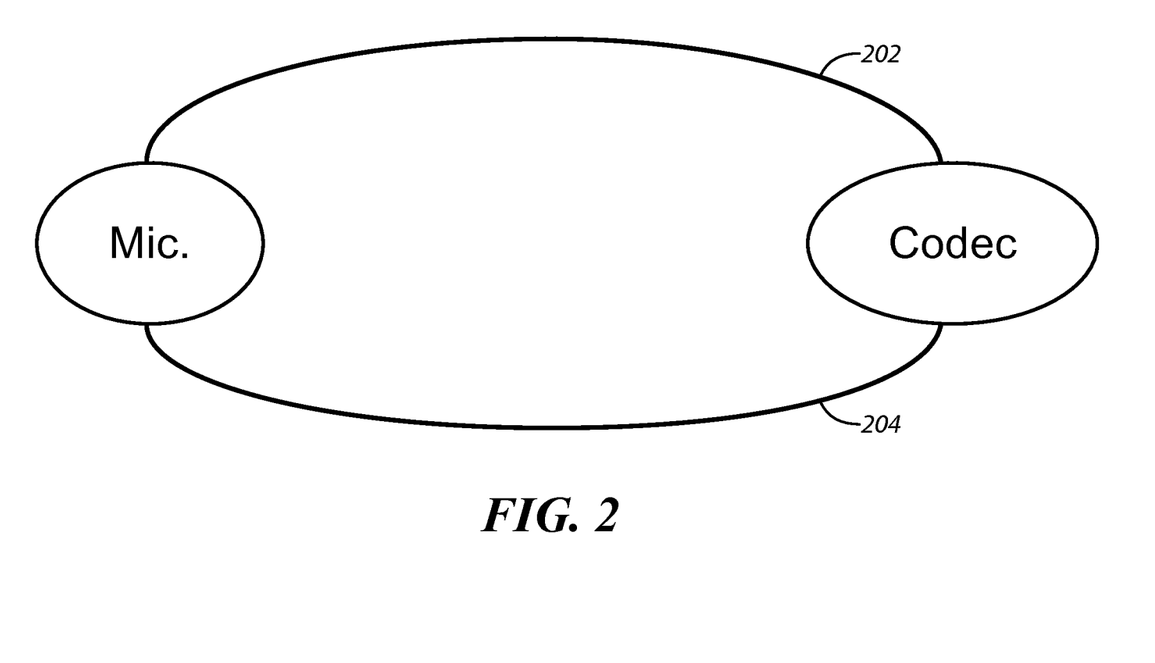
FIG. 2 comprises a state transition diagram showing an interrupt sequence according to various embodiments of the present invention.

Referring now to FIG. 2, one example of the bidirectional interrupt system that can be deployed in the approaches described herein is described. At step 202, the microphone 106 or 108 interrupts/wakes up the digital signal processor (DSP)/codec 110 in case of an event being detected. The event may be voice (e.g., it could be the start of the voice trigger word). At step 204, the digital signal processor (DSP)/codec 110 puts the microphone in back Event Detection mode in case no trigger word present. The digital signal processor (DSP)/codec 110 determines when to decide to change the microphone back to Event Detection mode. The internal VAD of the DSP/codec 110 could be used to make this decision and/or the internal voice trigger recognitions system of the DSP/Codec 110. For example, if the word trigger recognition didn't recognize any Trigger Word after approximately 2 or 3 seconds then it should decide to configure its input/output pin to be an interrupt pin again and then set the Microphone back into detecting mode (step 204 in FIG. 2) and then go into sleep mode/power down.

In another approach, the microphone may also track the time of contiguous voice activity. If activity does not persist beyond a certain countdown e.g., 5 seconds, and the microphone is also stays in the low power VAD mode of operation, i.e. not put into a standard or high performance mode within that time frame, the implication is that the voice trigger was not detected within that period of detected voice activity, then there is no further activity and the microphone may initiate a change to detection mode from detect and transmit mode. A DSP/Codec on detecting no transmission from the microphone may also go to low power sleep mode.

Figure 3:
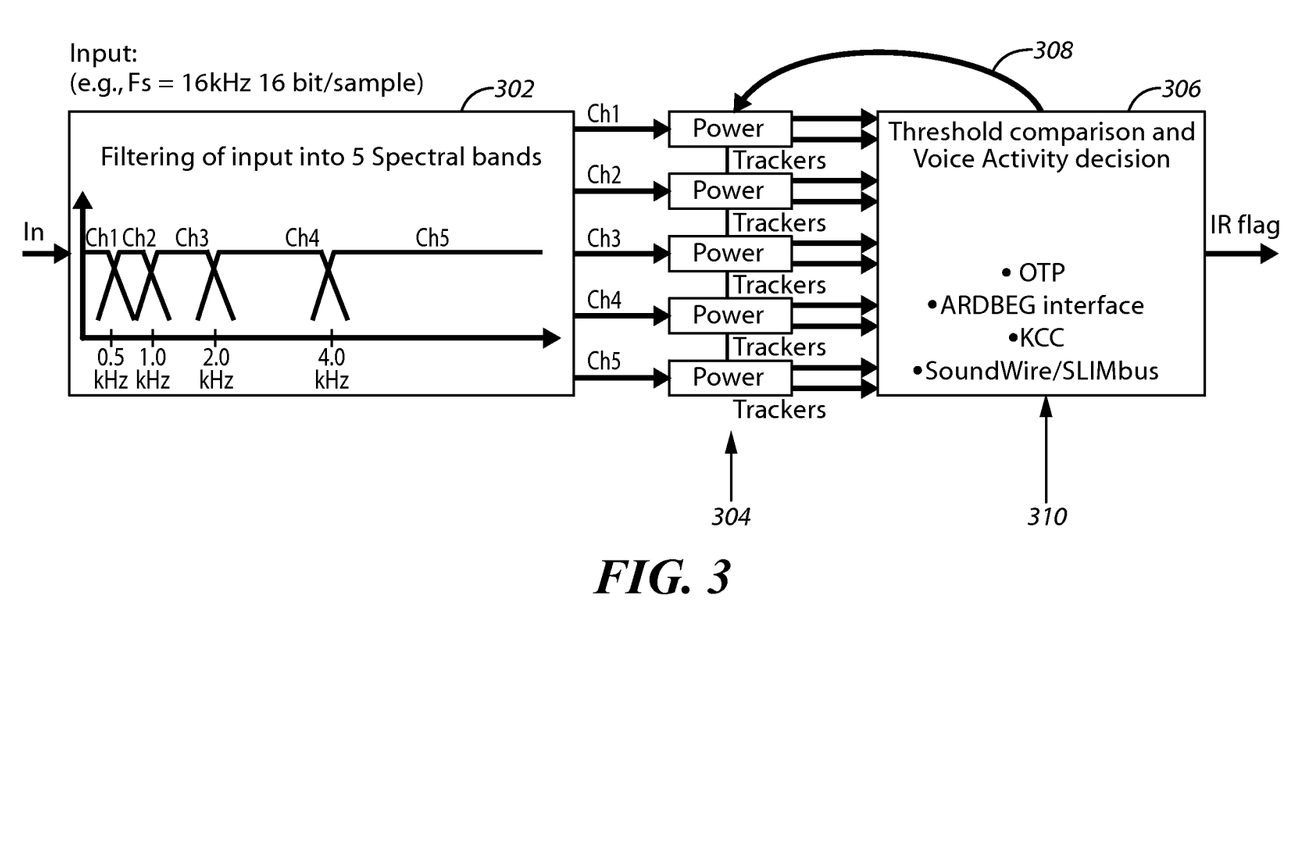
FIG. 3 comprises a block diagram of a VAD approach according to various embodiments of the present invention.

Referring now to FIG. 3, the VAD approaches described herein can include three functional blocks: an analyze filter bank 302, power tracker block or module 304, and a decision block or module 306. The analyze filter bank 302 filters the input signal into five spectral bands.

The power tracker block 304 includes an upper tracker and a lower tracker. For each of these and for each band it obtains a power estimate. The decision block 306 looks at the power estimates and determines if voice or an acoustic event is present.

Optionally, the threshold values can be set by a number of different approaches such as one time parts (OTPs), or various types of wired or wireless interface 310. Optionally feedback 308 from the decision block 306 can control the power trackers, this feedback could be the VAD decision. For example the trackers (described below) could be configured to use another set of attack/release constant if voice is present. The functions described herein can be deployed in any number of functional blocks and it will be understood that the three blocks described are examples only.

Figure 4:
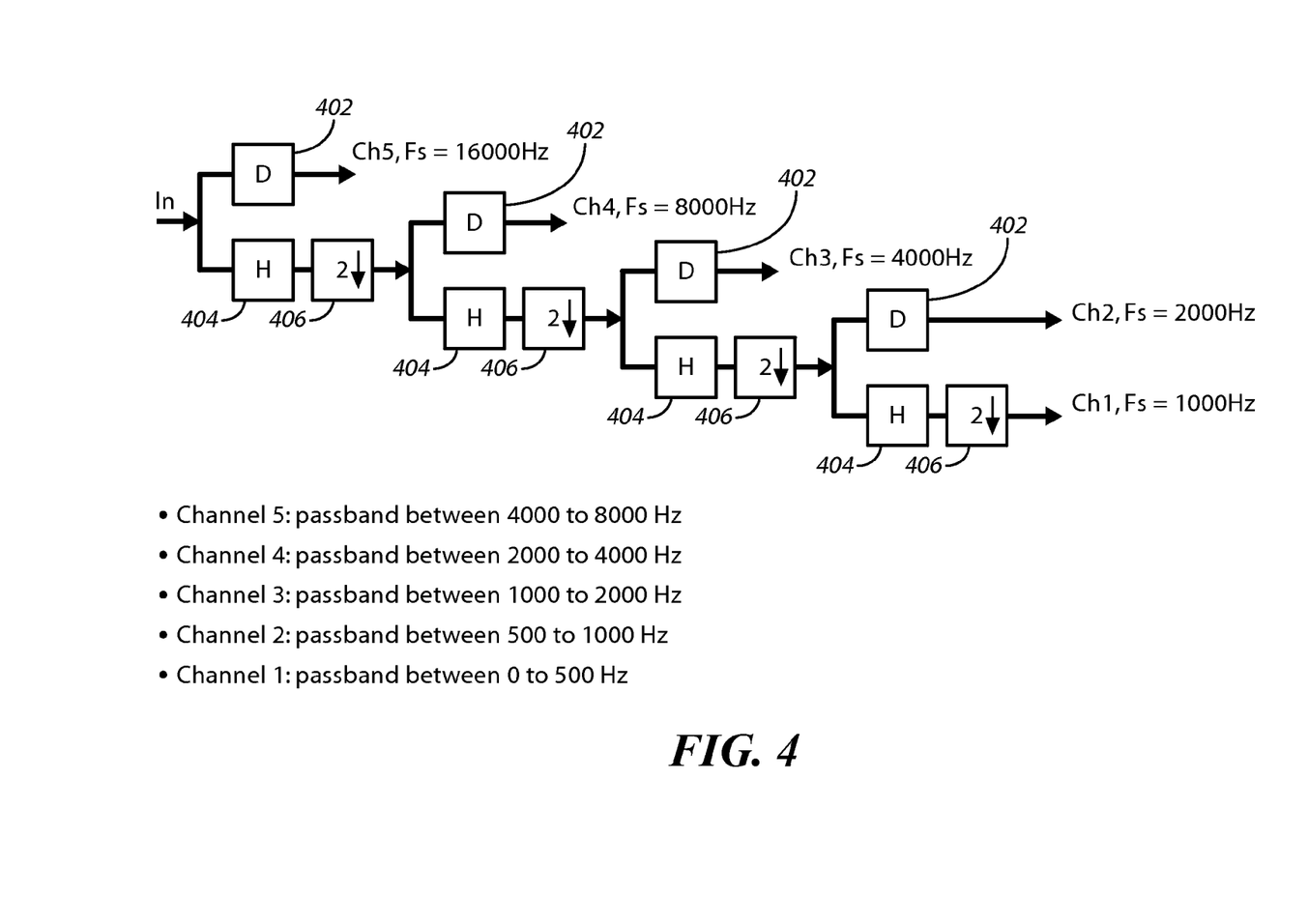
FIG. 4 comprises an analyze filter bank used in VAD approaches according to various embodiments of the present invention.
Figure 5:
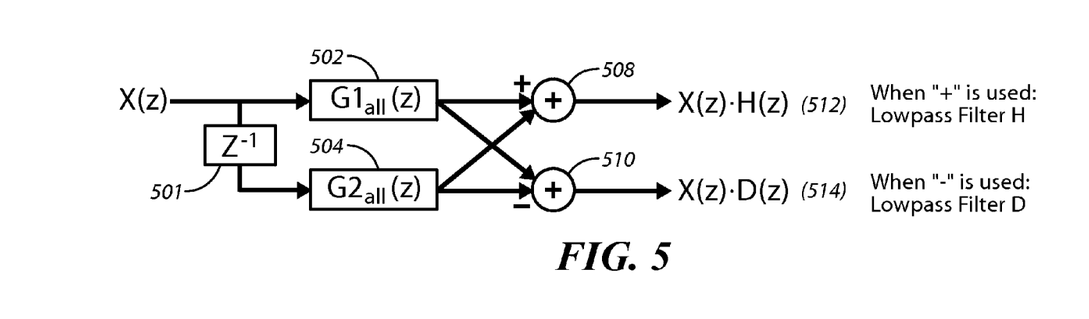
FIG. 5 comprises a block diagram of high pass and low pass filters used in an analyze filter bank according to various embodiments of the present invention.
Figure 6:
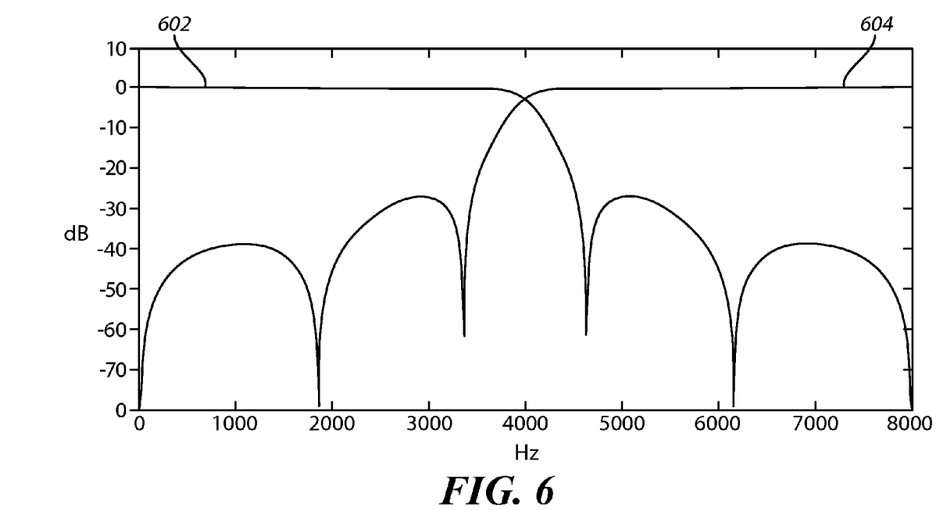
FIG. 6 comprises a graph of the results of the analyze filter bank according to various embodiments of the present invention.

Referring now to FIGS. 4, 5, and 6 one example of an analyze filter bank is described, the processing is very similar to the subband coding system, which may be implemented by the wavelet transform, by Quadrature Mirror Filters (QMF) or by other similar approaches. In the figure, the high pass decimation stage (D) is omitted compared to the more traditional subband coding/wavelet transform method. The reason for the omission is that later in the signal processing step an estimation of the root mean square (RMS) of energy or power value is obtained and it is not desired to overlap in frequency between the low pass filtering (used to derive the "Mean" of RMS) and the pass band of the analyze filter bank. This approach will relax the filter requirement to the "Mean" low pass filter. However the decimation stage could be introduced as this would save computational requirements.

Referring now to FIG. 4, the filter bank includes high pass filters 402 (D), low pass filters 404 (H), and sample frequency dividers 406 (Fs is the sample frequency of the particular channel). This apparatus operates similarly to a sub-band coding approach and has a consistent relative bandwidth as the wavelet transforms. The incoming signal is separated into five bands. Other numbers of bands can also be used. In this example, channel 5 has a pass band between 4000 to 8000 Hz; channel 4 has a pass band between 2000 to 4000 Hz; channel 3 has a pass band between 1000 to 2000 Hz; channel 2 has a pass band between 500 to 1000 Hz; and channel 1 has a pass band between 0 to 500 Hz.

Referring now to FIG. 5, the high pass filter 404 (D) and the low pass filter 406 (H) are constructed from two all pass filters 502 (G1) and 504 (G2) these filters could be first or second order all pass IIR structures. In the input signal passes through delay block 506. By changing the signs of adders 508 and 510, a low pass filtered sample 512 and a high pass filtered sample 514 are generated. Combining this structure with the decimation structure gives several benefits for example the order of the H and D filter are double (e.g., two times), and the number of gates power are reduced in the system.

Referring now to FIG. 6, response curves for the high pass and low pass elements are shown. A first curve 602 shows the low pass filter response while a second curve 604 shows the high pass filter response.

Figure 7:
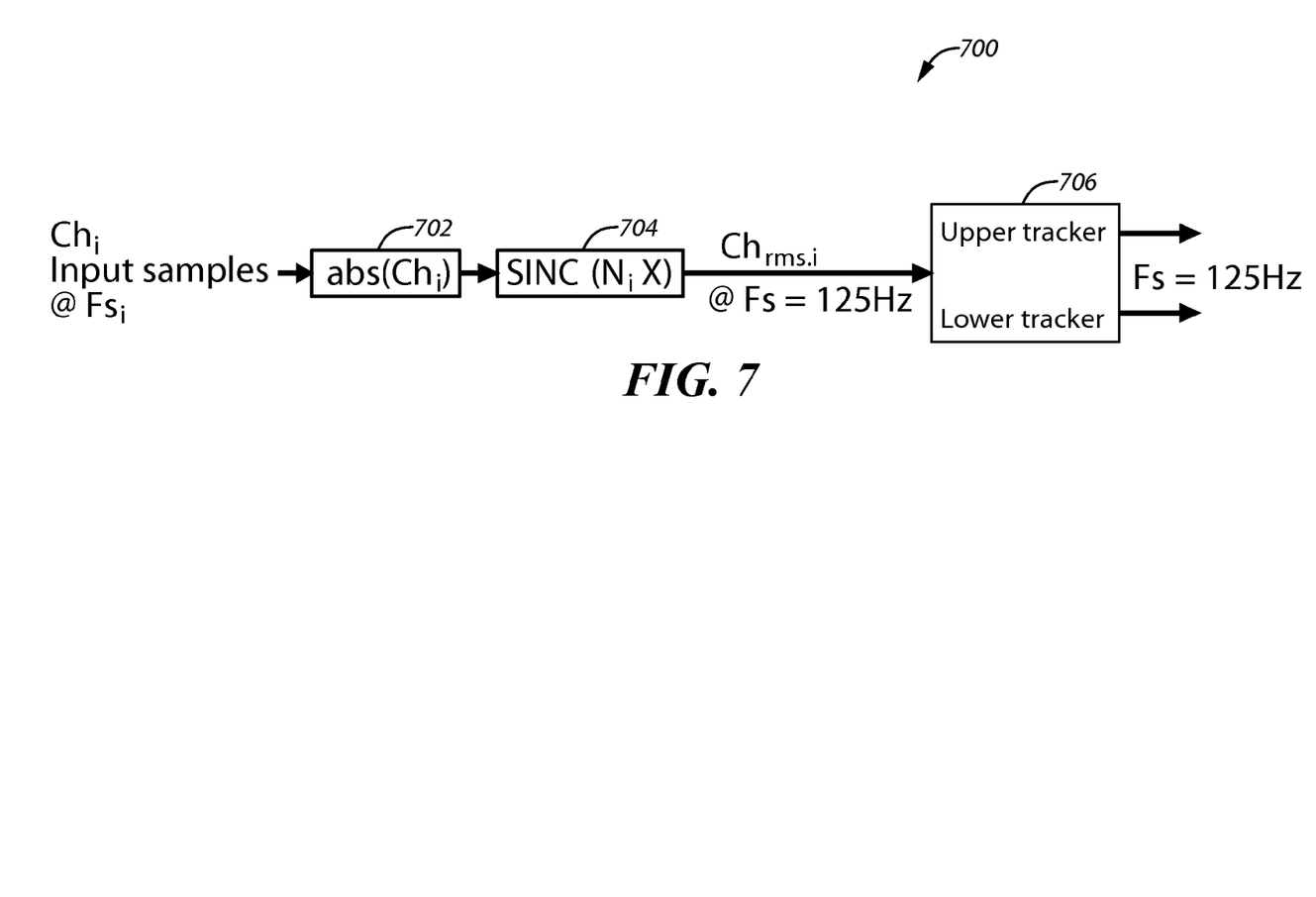
FIG. 7 comprises a block diagram of the tracker block according to various embodiments of the present invention.
Figure 8:
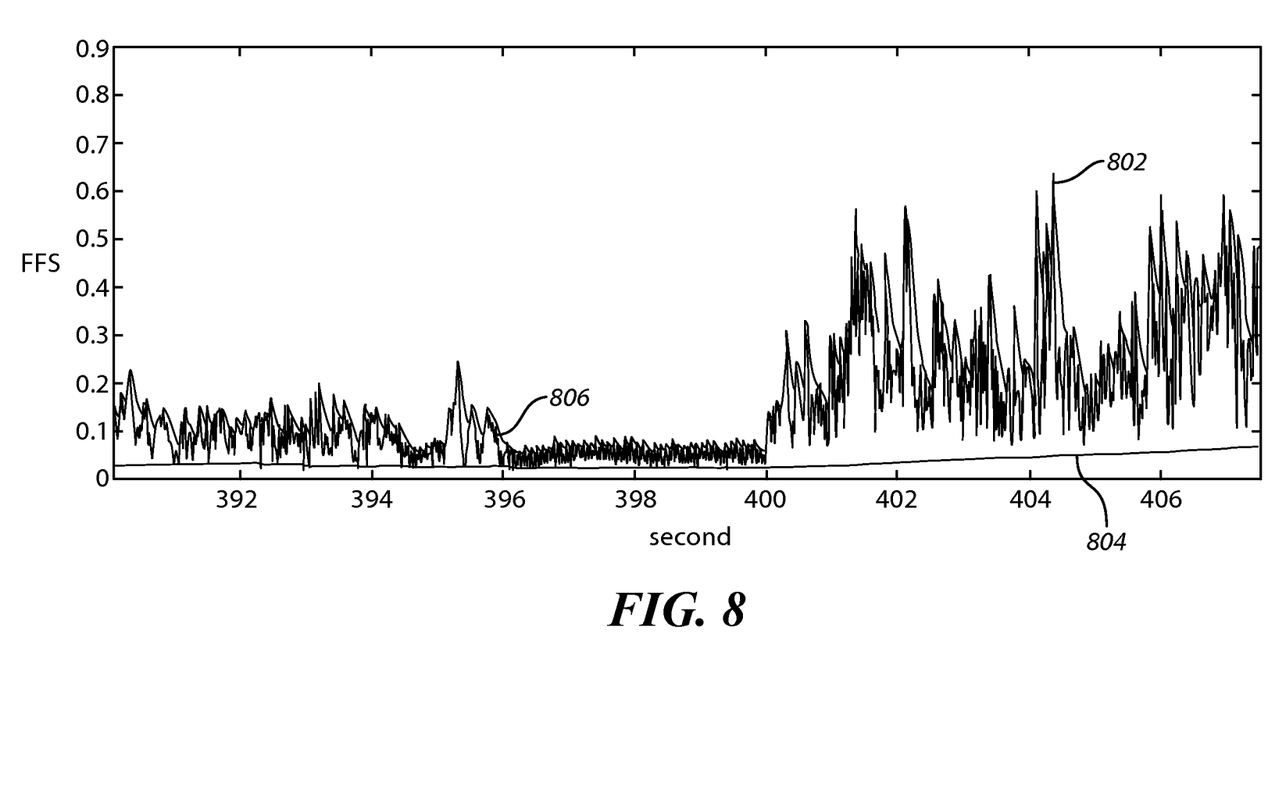
FIG. 8 comprises a graph of the results of the tracker block according to various embodiments of the present invention.

Referring now to FIGS. 7 and 8 one example of the power tracker block or module 700 is described. The tracker 700 includes an absolute value block 702, a SINC decimation block 704, and upper and lower tracker block 706. The block 702 obtains the absolute value of the signal (this could also be the square value). The SINC block 704 is a first order SINC with N decimation factor and it simply accumulates N absolute signal values and then dumps this data after a predetermined time (N sample periods). Optionally, any kind of decimation filter could be used. A short time RMS estimate is found by rectifying and averaging/decimating by the SINC block 704 (i.e., accumulation and dump, if squaring was used in block 704 then a square root operator could be introduced here as well). The above functions are performed for each channel, i=1 to 5. The decimation factors, N, are chosen so the sample rate of each short time RMS estimate is 125 Hz or 250 Hz except the DC channel (channel 1) where the sample rate is 62.5 Hz or 125 Hz. The short time ($Ch_{rms,i}$) values for each channel, i=1 to 5, are then fed into two trackers of the tracker block 706. A lower tracker and an upper tracker, i.e., one tracker pair for each channel are included in the tracker block 706. The operation of the tracker block 706 can be described as:

$$\text{upper}_i(n) =$$
$$\begin{cases} \text{upper}_i(n-1) \cdot (1 - Kau_i) + Kau_i \cdot Ch_{rms,i}(n), & \text{if } Ch_{rms,i}(n) > \text{upper}_i(n-1) \\ \text{upper}_i(n-1) \cdot (1 - Kru_i) + Kru_i \cdot Ch_{rms,i}(n) & \text{otherwise} \end{cases}$$

$$\text{lower}_i(n) =$$
$$\begin{cases} \text{lower}_i(n-1) \cdot (1 - Kal_i) + Kal_i \cdot Ch_{rms,i}(n), & \text{if } Ch_{rms,i}(n) < \text{lower}_i(n-1) \\ \text{lower}_i(n-1) \cdot (1 - Krl_i) + Krl_i \cdot Ch_{rms,i}(n) & \text{otherwise} \end{cases}$$

The sample index number is n, $Kau_i$ and $Kru_i$ are attack and release constants for the upper tracker channel number i. $Kal_i$ and $Krl_i$ are attack and release constants for the lower tracker for channel number i. The output of this block is fed to the decision block described below with respect to FIG. 9.

Referring now to FIG. 8, operation of the tracker block is described. A first curve 802 shows the upper tracker then follows fast changes in power or RMS. A second curve 804 shows the lower tracker following slower changes in the power or RMS. A third curve 806 represents the input signal to the tracker block.

Figure 9:
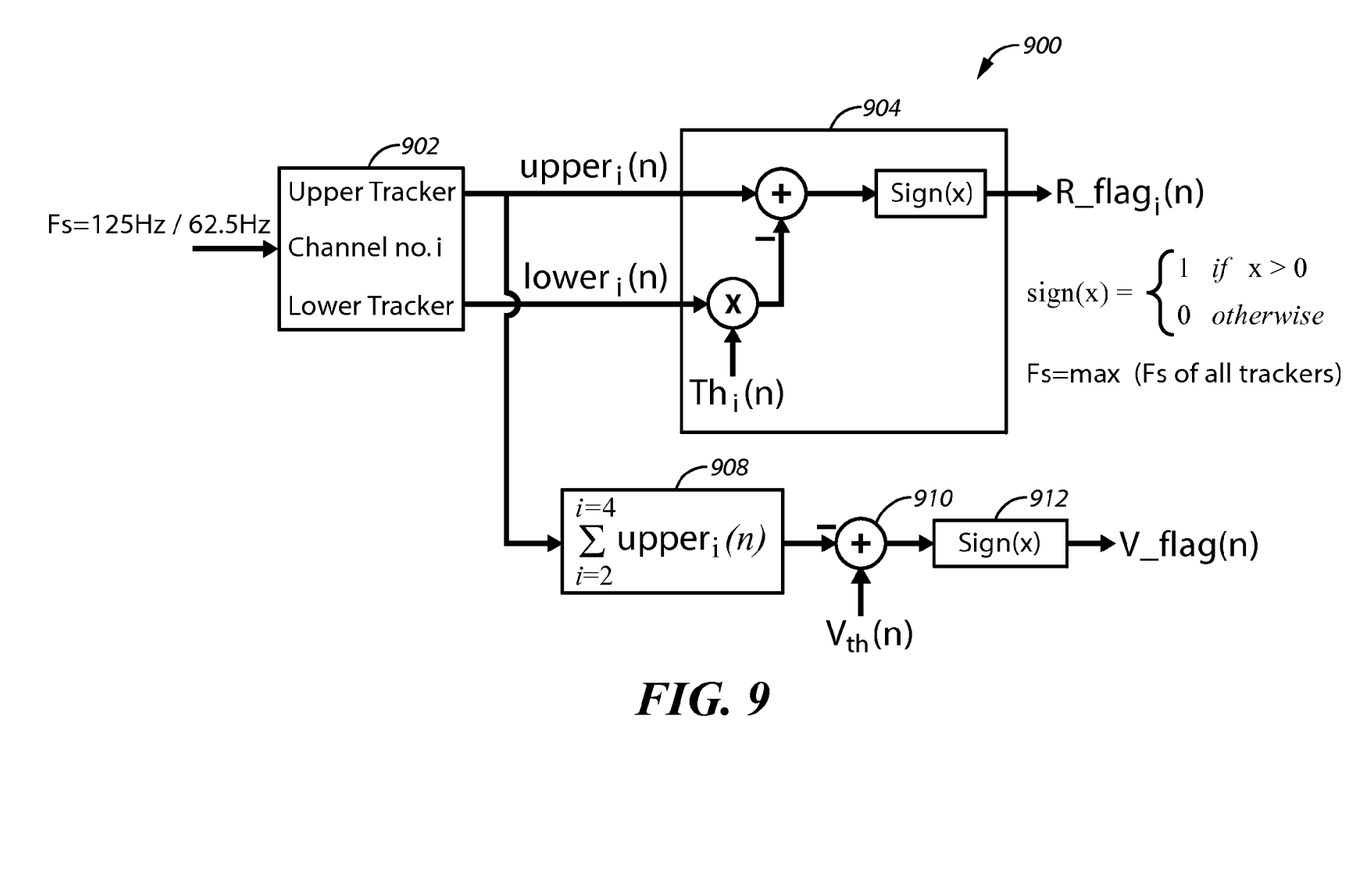
FIG. 9 comprises a block diagram of a decision block according to various embodiments of the present invention.

Referring now to FIG. 9, one example of a decision block 900 is described. Block 902 is redrawn in FIG. 9 in order to make it easier for the reader (blocks 706 and 902 are the same tracker blocks). The decision block uses the output from the trackers, a division block 904 to determine the ratio between the upper and lower tracker for each channel, summation block 908, comparison block 910, and sign block 912.

The internal operation of the division block 904 is structured and configured so that an actual division need not be made. The lower tracker value Lower$_i$(n) is multiplied by Th$_i$(n) (a predetermined threshold which could be constant and independent of n or changed according to a rule). This is subtracted from the Upper$_i$(n) tracker value. The sign(x) function is then performed.

Upper and lower tracker signals are estimated by upper and lower tracker block 902 (this block is identical to block 706). The ratio between the upper tracker and the lower tracker is then calculated by division block 904. This ratio is compared with a flag R-Flag$_i$(n). This flag is set if the ratio is larger than the threshold Th$_i$(n) i.e., if sign(x) in 904 is positive. This operation is performed for each channel i=1 to 5. Th$_i$(n) could be constant over time for each channel or follow a rule where it actually change for each sample instance n.

In addition to the ratio calculation for each channel i=1 to 5 (or 6 or 7 if more channels are available from the filterbank), the ratios between channels can also be used/calculated. The ratio between channel is defined for the i'th channel: Ratio$_{i,ch}$(n)=Upper$_{i=ch}$(n)/Lower$_{i \ne ch}$(n), i,ch are from 1 to the number of channels which in this case is 5. This means that ratio(n)$_{i,i}$ is identical to the ratio calculated above. A total number of 25 ratios can be calculated (if 5 filter bands exist). Again, each of these ratios is compared with a Threshold Th$_{i,ch}$(n). A total number of 25 thresholds exist if 5 channels are available. Again, the threshold can be constant over time n, or change for each sample instance n. In one implementation, not all of the ratios between bands will be used, only a subset.

The sample rate for all the flags is identical with the sample rate for the faster tracker of all the trackers. The slow trackers are repeated. A voice power flag V_flag(n) is also estimated as the sum of three channels from 500 to 4000 Hz by summation block 908. This flag is set if the power level is low enough, (i.e., smaller than V$_{th}$(n)) and this is determined by comparison block 910 and sign block 912 this flag is only in effect when the microphone is in a quiet environment or/and the persons speaking are far away from the microphone.

The R_flagi(n) and V_flag(n) are used to decide if the current time step "n" is voice, and stored in E_flag(n). The operation that determines if E_ flag (n) is voice (1) or not voice (0) can be described by the following:

```
E_flag(n) = 0;
If sum_from_1_to_5( R_flagi(n) ) > V_no (i.e., E_flag is set if
at least V_no channels declared voice )
    E_flag(n) = 1
    If R_flag1(n) == 0 and R_flag5(n) == 0
        E_flag(n) = 0
    If V_flag(n) == 1
        E_flag(n) = 0
```

The final VAD_flag(n) is a smoothed version of the E_flag (n). It simply make a VAD positive decision true for a minimum time/period of VAD_NUMBER of sample periods This smoothing can be described by the following approach. This approach can be used to determine if a voice event is detected, but that the voice is present in the background and therefore of no interest. In this respect, a false positive reading is avoided.

```
VAD_flag(n)=0
If E_flag(n) == 1
    hang_on_count=VAD_NUMBER;
else
    if hang_on_count ~= 0
        decrement( hang_on_count)
        VAD_flag(n)=1
    end
end
```

Hang-on-count represents a time of app VAD_NUMBER/ Sample Rate. Here Sample rate are the fastest channel i.e., 250, 125 or 62.5 Hz. It will be appreciated that these approaches examine to see if 4 flags have been set. However, it will be appreciated that any number of threshold values (flags) can be examined.

It will also be appreciated that other rules could be formulated like at least two pair of adjacent channel (or R_flag) are true or maybe three of such pairs or only one pair. These rules are predicated by the fact that human voice tends to be correlated in adjacent frequency channels, due to the acoustic production capabilities/limitations of the human vocal system.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, comprising:
   at a processing device, receiving a first signal from a first microphone and a second signal from a second microphone, the first signal affirmatively and without further processing indicating whether a voice signal has been determined by a first VAD module at the first microphone, and the second signal affirmatively and without further processing indicating whether a voice signal has been determined by a second VAD module at the second microphone, the processing device being physically separate and distinct from the first microphone and the second microphone;
   when the first signal indicates potential voice activity or the second signal indicates potential voice activity, activating the processing device to receive data and subsequently examining the data for a trigger word and when the trigger word is found, sending a first control signal to an application processor that is physically separate and distinct from the processing device, the first microphone, and the second microphone to activate the application processor to further process information from one or more of the first microphone and the second microphone;
   when no trigger word is found, resetting the processing device to deactivate data input and sending a second control signal from the processing device to the first microphone and the second microphone causing the first microphone and the second microphone to enter or maintain an event detection mode of operation where no data is being output from the first microphone or the second microphone.

2. The method of claim 1, further comprising wherein the application processor utilizes a voice recognition (VR) module to determine whether other or further commands can be recognized in the information.

3. The method of claim 1 wherein the first microphone and the second microphone transmit pulse density modulation (PDM) data.

4. The method of claim 1, wherein the first microphone includes a first voice activity detection (VAD) module that determines whether voice activity has been detected, and the second microphone includes a second voice activity detection (VAD) module that determines whether voice activity has been detected.

5. The method of claim 4, wherein the first VAD and the second VAD module perform the steps of:
receiving a sound energy from a source;
filtering the sound energy into a plurality of filter bands;
obtaining a power estimate for each of the plurality of filter bands; and
based upon each power estimate, determining whether voice activity is detected.

6. The method of claim 5, wherein the filtering utilizes one or more low pass filters, high pass filters, and frequency dividers.

7. The method of claim 5, wherein the power estimate comprises an upper power estimate and a lower power estimate.

8. The method of claim 4, wherein either the first VAD module or the second VAD module performs Trigger Phrase recognition.

9. The method of claim 4, wherein either the first VAD module or the second VAD module performs Command Recognition.

10. The method of claim 1, wherein the processing device controls the first microphone and the second microphone by varying a clock frequency of a clock supplied to the first microphone and the second microphone.

11. A system, the system comprising:
a first microphone with a first voice activity detection (VAD) module;
a second microphone with a second voice activity detection (VAD) module;
a processing device communicatively coupled to the first microphone and the second microphone, the processing device configured to receive a first signal from the first microphone and a second signal from the second microphone, the first signal affirmatively and without further processing indicating whether a voice signal has been determined at the first microphone by the first VAD module, and the second signal affirmatively and without further processing indicating whether a voice signal has been determined at the second microphone by the second VAD module, the processing device being physically separate and distinct from the first microphone and the second microphone, the processing device further configured to when the first signal indicates potential voice activity or the second signal indicates potential voice activity, activate and receive data from the first microphone or the second microphone, and subsequently examine the data for a trigger word, and when the trigger word is found, send a first control signal to an application processor that is physically separate and distinct from the processing device, the first microphone, and the second microphone to activate the application processor to further process information from one or more of the first microphone and the second microphone, the processing device further configured to when no trigger word is found, transmit a second control signal to the first microphone and the second microphone, the second control signal causing the first microphone and second microphone to enter or maintain an event detection mode of operation where no data is being output from the first microphone or the second microphone.

12. The system of claim 11, wherein either the first VAD module or the second VAD module performs Trigger Phrase recognition.

13. The system of claim 11, wherein either the first VAD module or the second VAD module performs Command Recognition.

14. The system of claim 11, wherein the processing device controls the first microphone and the second microphone by varying a clock frequency of a clock supplied to the first microphone and the second microphone.

* * * * *